Feb. 5, 1957  H. J. ASBECK ET AL  2,780,496
MULTI-COMPONENT SPRAY GUN
Filed Nov. 29, 1952  3 Sheets-Sheet 1

INVENTORS
HANS J. ASBECK AND
BY FRANK E. EHRETT
Robert A. Sturges
ATTORNEY.

Feb. 5, 1957 H. J. ASBECK ET AL 2,780,496
MULTI-COMPONENT SPRAY GUN
Filed Nov. 29, 1952 3 Sheets-Sheet 2
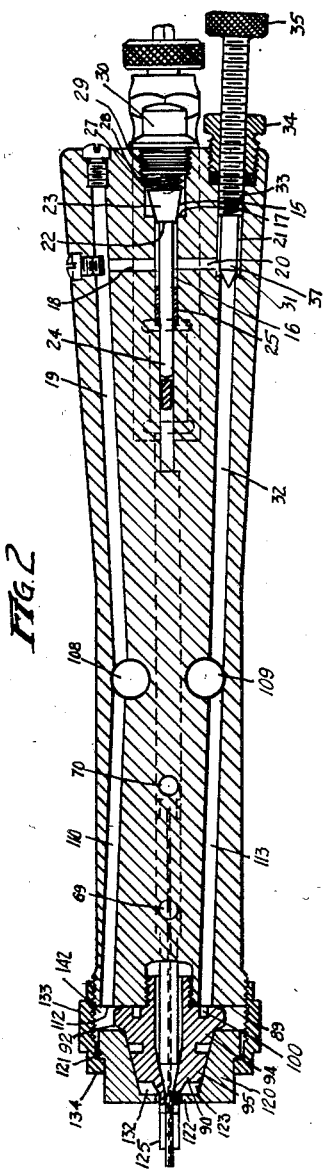
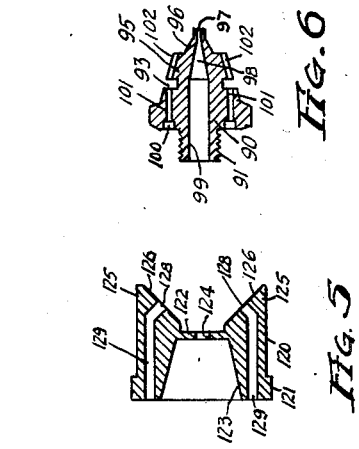
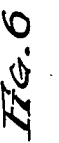
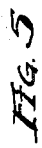
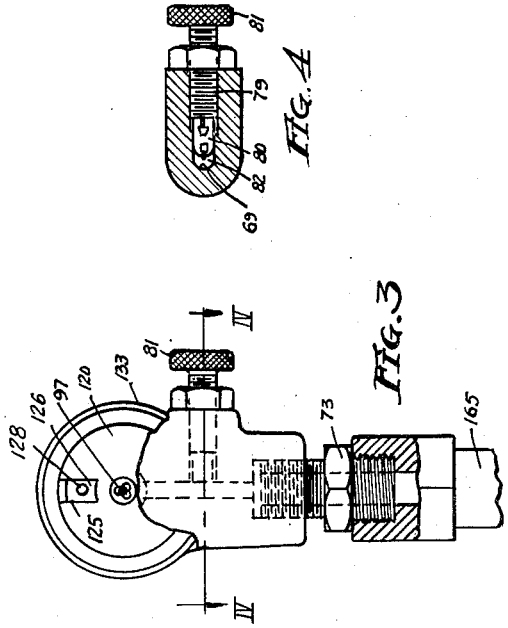
INVENTORS
HANS J. ASBECK AND
BY FRANK E. EHRETT
Robert A. Sturges
ATTORNEY.

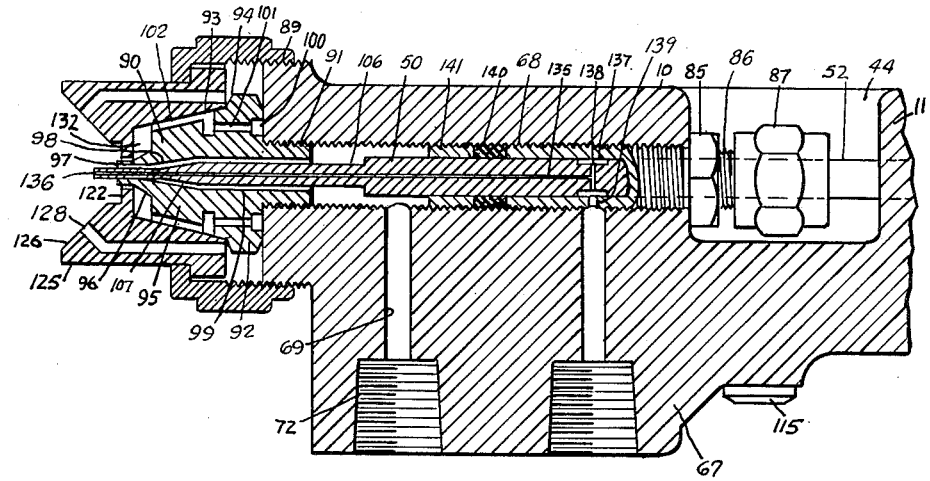

United States Patent Office 2,780,496
Patented Feb. 5, 1957

2,780,496
MULTI-COMPONENT SPRAY GUN

Hans J. Asbeck, Lakewood, Ohio, and Frank E. Ehrett, Grand Rapids, Mich., assignors to The Sherwin-Williams Company, Cleveland, Ohio, a corporation of Ohio Application November 29, 1952, Serial No. 323,318

8 Claims. (Cl. 299—140.1)

This invention relates to novel spray devices for spray materials, such as paints, reactive fluids and the like. More particularly the invention is directed to novel spray guns for simultaneously spraying a chemically curing resin with a catalyst or activator which causes the resin to set.

According to this invention, a plurality of different fluid media, for example two liquids and a gas, e. g., chemically curing resins, curing agents therefor and air or an inert gas, are fed into separate fluid receiving chambers terminating in two individual orifices. The viscosity and/or color and/or reactivity of one fluid may differ from the corresponding characteristics of another fluid entering and discharged from the guns of this invention. The inlet or places of entry of said fluids are distinctly and separately spaced apart from each other; and said fluids as they enter their respective chambers are disposed at an appreciable angle and preferably at approximately right angles to the longitudinal axis of each receiving chamber. It has been found most practical to add the fluid of greater viscosity to its chamber at a place closer to its orifice than the place of entry of said fluid of lower viscosity. The chemically reactive fluids, such as, curing resins and their curing agents which may be fluids of different viscosity, are discharged from their respective orifices and as they leave these orifices in the course of their travel toward the surface to be coated, a gaseous medium, such as air or an inert gas, e. g., nitrogen, or the like, atomizes said discharge and mixes the particles of discharge prior to their reaching the surface to be coated. A distinguishing feature of the devices of this invention is that the fluids ejected from a single control source are intimately admixed externally of the gun in an atomized state. The shape of the spray may be controlled by a plurality of opposite streams of air projected towards each other and into the atomized discharge.

By employing our novel spray guns, we have obtained unusual surface coatings comprising, for example, chemically curing resins and curing agents therefor by employing a single spraying operation. One of the outstanding characteristics of this invention is that by employing the invention, not only may a chemically curing resin be sprayed but also many unusual and unique multicolored surface coatings may be sprayed by employing a single spraying operation.

Another object of this invention is to provide an improved spraying device.

Another object of this invention is to provide a novel spraying device for simultaneously spraying a mixture of different colored coating media onto the surface of an article to be coated.

Another object of this invention is to provide a novel spraying device for simultaneously spraying a mixture of different reactive materials onto a surface of an object to be coated wherein it is essential that the different reactive materials be kept separated until they are mixed outside of the spraying device.

The devices of this invention are also adaptable to use in the spraying of resinous film-forming materials which are catalytically hardened by controlled amounts of hardening agents which may be either liquid or gaseous, for example $SO_2$. In certain instances it may be found necessary to atomize the film-forming material in an inert atmosphere, in which case nitrogen or $CO_2$ may be employed as the atomizing fluid. Thus another object of this invention is the provision of a single spraying device for application of chemically curing film-forming compositions where premature exposure to air or other reactive gas is to be avoided until just prior to casting the film.

Other objects of this invention appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

Broadly stated this invention is in the provision of a multi-component spraying device which is characterized in that the several fluids are maintained separate within the device, becoming admixed externally of the device. This is achieved by providing in a multi-component spraying device, an elongated fluid receiving chamber divided into a plurality of non-communicating inner units, fluid supply inlets communicating with said non-communicating inner units, a hollow rod adapted to receive and discharge fluid from one of said inner units, and an exit from another of said inner units annular with respect to said hollow rod, said hollow rod projecting beyond said exit when the gun is fully triggered. More specifically, this invention is in the improvement of a plural fluid spraying device, said improvement comprising the provision of an elongated fluid receiving chamber divided into a plurality of non-communicating inner units, fluid supply inlets communicating with said non-communicating inner units, a hollow valve rod adapted to receive and discharge fluid from one of said fluid supply inlets, a discharge orifice formed to maintain said hollow valve rod in a substantially axial position with respect to said orifice while permitting the flow of fluid from another of said fluid supply inlets when said hollow valve rod is in a triggered position, said hollow valve rod when in a fully triggered position projecting beyond said orifice.

More specifically stated, the invention comprises a method of spray coating a surface, comprising feeding a plurality of reactive film-forming fluids into a divided elongated fluid receiving chamber having a plurality of discharge orifices, discharging said fluids in separate streams from said chamber, said fluids being fed separately through openings located one entirely behind the other with respect to said orifices and along the length of said divided elongated fluid receiving chamber, applying gas under pressure to one of said streams in the substantially immediate vicinity of the orifice communicating with the portion of said divided elongated chamber into which the latter fluid is introduced to convert said stream into a spray, admixing with said spray the discharge from another portion of said divided elongated fluid receiving chamber, subjecting said spray to gas under pressure to modify the shape of said spray and to intimately admix said previously separated fluids, and then depositing said spray onto the surface to be coated.

Fig. 2 is a horizontal longitudinal cross-sectional view taken along line 2—2 of Fig. 1 in the direction of the arrows.

Fig. 3 is a view in front elevation of the fluid throttling means shown in Figs. 1 and 2 but modified to show a modification of the fluid line throttling means shown in Figs. 1 and 2.

Fig. 4 is a cross-sectional view taken on the line 4—4 of Fig. 3 and in the direction of the arrows.

Fig. 5 is a cross-sectional view of a gas cap shown in Figs. 1 and 2.

Fig. 6 is a cross-sectional view of the fluid tip shown in Figs. 1 and 2.

Fig. 7 is a fragmentary view of a cross-sectional area of the novel separating means employed in this invention.

Fig. 8 is a front view of a fluid tip.

Figure 1:
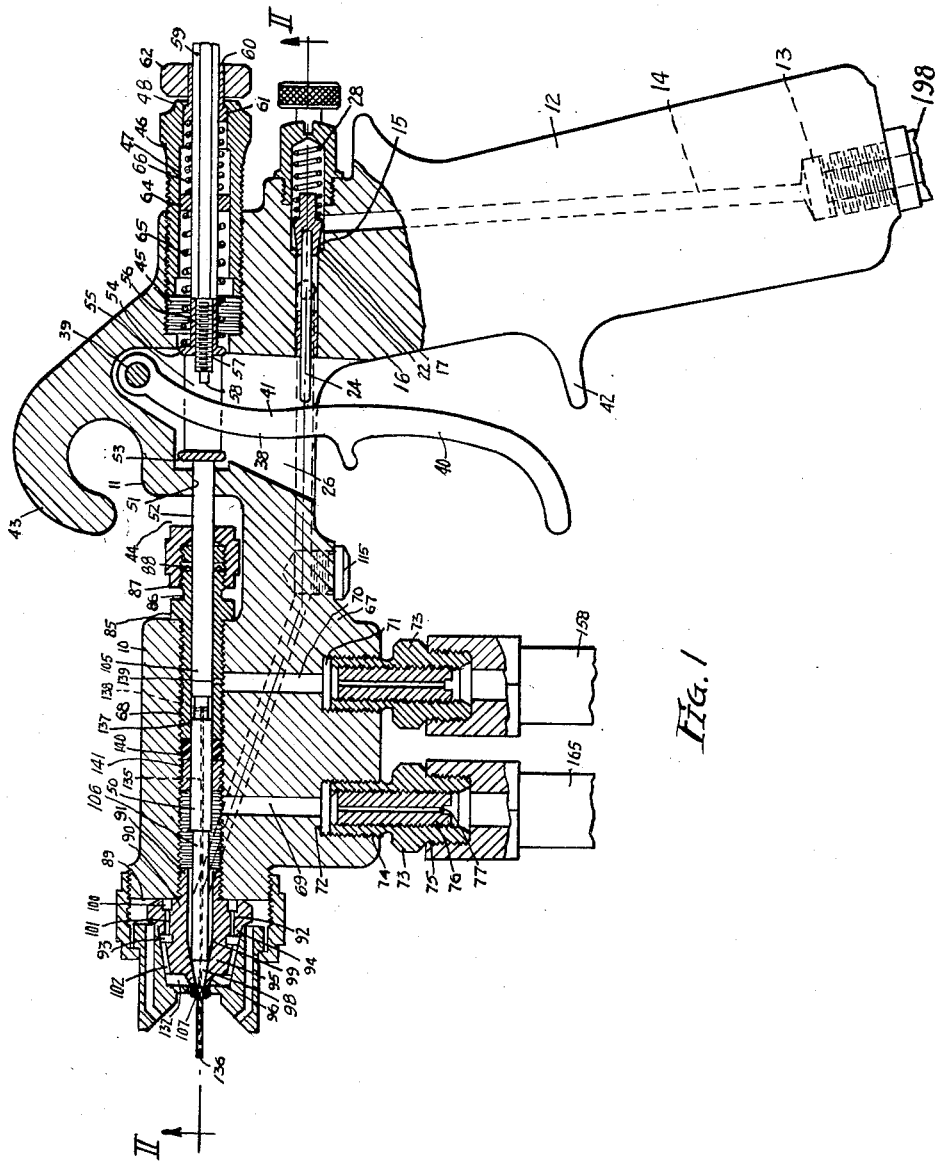
Fig. 1 represents a vertical longitudinal cross-sectional view of a spraying device embodying the invention.

Referring to the drawings, the numeral 10 designates the body of a paint spraying device illustrating the invention. The body 10 includes a barrel portion 11 and a handle portion 12. The handle portion 12 extends downwardly from the barrel portion 11 and is inclined slightly to the rear thereof so that the body 10 has somewhat the appearance of an automatic revolver.

The lower end of the handle portion 12 has an internally threaded opening 13 therein. The opening 13 communicates with a passage 14 which extends upwardly through the interior of the handle 12 to an air inlet valve chamber 15 in the rear part of the barrel portion of body 10. The chamber 15 communicates with an air distributing chamber 16 disposed forwardly thereof in barrel portion 11. The chamber 16 is of smaller diameter than the chamber 15 and the shoulder at the end of the chamber 15 as it meets chamber 16 acts as a valve seat 17. A passageway 18 communicates with and extends from chamber 16 directly to a passageway 19 (Fig. 2) extending along the barrel portion 11 from its rear towards the nozzle end of the device. Another passageway 20 (Fig. 2) communicates with and extends from chamber 16 directly to a valve chamber 21.

Mounted in the valve chamber 15 is a suitable valve member 22 having a valve proper 23 adapted to engage the valve seat 17 and having an operating rod or stem 24 integral therewith and extending forwardly therefrom. The valve stem 24 extends through a suitable bearing opening 25 in the barrel portion and into an open inverted approximately V-shaped slot 26 in said barrel portion. The rear end of the valve member 23 is provided with a stud or projection 27 receiving one end of a coiled compression spring 28. The other end of said spring 28 is positioned in an exteriorly threaded socket 29 integral with and disposed at the forward end of a securing and tensioning adjusting nut 30 secured to the interiorly threaded rear end of the valve chamber 15. By this means the valve proper 23 is normally held in tight engagement with the valve seat 17 so that if air under pressure is admitted to the chamber 15 through the communicating passageways 13 and 14, no air under pressure is admitted through the passages 16, 18, 19, 20 and 21.

The degree of force of the valve 22 in the direction of the valve seat 17 is controlled by the compression spring 28 which in turn is controlled by the nut 30.

The valve chamber 21 is provided with a valve seat 31 and communicates with and leads into a passageway 32, extending in the same direction as passageway 19 along the barrel interior and towards the nozzle end of the device. A needle valve 33 is mounted in the valve chamber 21 through an internally threaded portion of a mounting nut 34. The outer end of the valve 33 terminates in a knurled manipulating knob 35 by which the inner or valve end 37 may be adjusted relative to the valve seat 31 to regulate the flow of air into passage 32 as desired or to cut it off completely if required.

A trigger 38 has its upper end located at the apex of the slot 26 and is pivotally connected at its upper end to the barrel portion 11 by a pivot pin or bolt 39. The trigger 38 extends below the slot 26 and its downwardly extending lower portion 40 is curved to provide a hand saddle so it may be readily and positively engaged by certain fingers of the hand of an operator. The rear face of that portion of the trigger 38 in the slot 26 has a rear bearing face 41 engaging the free front end of the valve stem 24. When the trigger 38 is swung rearwardly about the pivot 39 the valve stem 24 and the valve proper 23 are forced rearwardly against the action of the spring 28 whereupon the valve 23 is moved away from the valve seat 17 to permit the admission of air under pressure from the chamber 15 into passageways 16, 18, 19, 20 and 21 and if the needle valve 33 is in an open position, into passage 32.

The rearward movement of the trigger 38 is limited by means of the abutment of the lower portion 40 thereof against an external face of the handle portion 12. Spring 28 is of sufficient strength normally to hold the valve 22 in closed position and the trigger in its fully extended open position shown in full lines in Fig. 1 and to cause these parts to assume these positions when the external pressure on the trigger is sufficiently reduced. Thus a very simple and delicate control is provided for controlling the admission of air into the device and it is very easily regulated by an operator without the necessity of long training and experience. For additional ease of manipulation and to insure a firm grip, the handle portion 12 is provided with a finger lug or guard 42 projecting from said handle portion 12 directly below and adjacent the lower end of the trigger.

The barrel portion 11, when the gun is held in a normal position, extends in a horizontal direction forwardly from the handle portion 12, and is provided with a curved lug or hook 43 to provide a convenient hanging means for the device when not in use. On its upper part and in the vicinity of the mid-length of the barrel portion, there is provided a cut-out portion 44. The barrel portion 11 is bored centrally at its rear to provide a valve operating chamber 45 interconnecting with the slot 26 in barrel 11. Chamber 45 is internally threaded and has threadedly coupled thereto a hollow elongated nut 46 screwed into the rear end thereof. The nut 46 has a spring chamber 47 and a central opening 48 at its rear end and axially aligned therewith.

A partially hollow valve rod 50, for controlling the supply of fluid material, extends into the valve operating chamber 45 through its front end and is movably mounted within a forward bearing part 51 of the central barrel bore. Inside said chamber 45 said rod 50 is enlarged in diameter at 52 and is provided with two spaced shoulders 53 and 54. A vertical slot 55 is provided in the rod 50 between shoulders 53 and 54 and the upper portion of trigger 38 passes therethrough and is movable therein. The rear end of rod 50 is provided with an internally threaded bore 56 extending from said end through the rear end of slot 55. Threadedly engaged in said bore 56 is an operating rod 57 having a forward nose 58 projecting into said slot 55 and is adapted to be engaged by the trigger 38 when said trigger is moved rearwardly to operative position as hereinbefore described. Operating rod 57 may be of hexagonal or other polygonal shape in sections as at 59. A riveting collar 60 is slidably borne to the rear end of rod 50. This collar 60 has a flange 61 which engages the inner shoulder at the rear end of the nut 46. A rotatable knob 62 is fixedly mounted on collar 60 so that rotation of knob 62 will rotate collar 60 and in turn the rod 57.

Intermediate its ends, rod 57 is provided with a slide ring 64. A coiled spring 65 is mounted around the front part of rod 57, with one end of said spring abutting against shoulder 54 and its other end against one face of ring 64. A coiled spring 66 is mounted around the rear part of rod 59, with one end engaging the opposite face of the ring 64 and its other end abutting against the flange 61. These springs 65 and 66 normally urge the rod 57 and consequently valve rod 50 forwardly.

The adjustable positioning of the nose 58 through the knob 61 by the parts above described so that it is nearer to or further away from the trigger 38 permits a fine variation of the relative movement of the partially hollow valve 50 when the trigger is actuated, as well as a fine control of the relative time of opening of the air valve 23 and the fluid outlet valve when the trigger is moved. The time may be thus controlled to effect simultaneous operation of the air and fluid outlet valves or later opening of the fluid outlet valve with respect to the air valve 23. In Fig. 1, the position of the nose 58 is such that the trigger 39 will first engage the stem 24 to first open valve 23 and then engages nose 58 to actuate valve rod 50.

The forward end of the barrel portion 11 is provided with an internally threaded longitudinal bore 68. The lower part of the barrel portion 11 is enlarged at its underside to provide an extension 67 having a plurality of, and as shown, merely for the purposes of illustration, two supply passageways 69 and 70 communicating with the longitudinal bore chamber 68. These passageways 69 and 70 may be of the same or of different lengths and diameters and as illustratively shown are of the same dimensions. Each of said passageways is preferably disposed roughly at right angles to the chamber 68 and depends therefrom. The passageways 69 and 70 are preferably one behind the other in single file relationship and are roughly parallel to each other and are located in about the same plane. The passageways 69 and 70 may be cylindrical and terminate at their lower ends in respectively enlarged internally threaded coupling bores 71 and 72, whose diameters are the same and materially greater than the diameter of the passageways 69 and 70.

De-mountably mounted in each coupling bore 71 and 72 is a double nipple 73 having each of its ends 74 and 75 threaded. The hollow nipple 73 may be internally threaded and may have de-mountably mounted therein, an exteriorly threaded cylinder 76 having a central cylindrical bore or passageway 77. The dimensions of the bore or passageway 77 are preferably such that the length thereof is many times the diameter. In one embodiment of the invention, the length of passageway 77 is at least 5 times the diameter thereof. The diameter of the passageway 77 may be much less than the diameter of passageways 69 and 70. While the passageway 77 may be of the same diameter, in certain instances we prefer to employ cylinders 76 having passageways 77 of different diameters.

In certain other instances, as for example the spray application of chemically curing resins, especially where the film-forming resin is a thick, viscous liquid, the cylinders 76, either one or both, may be eliminated from the device, thus providing unobstructed passages into the chamber 68.

Instead of coupling the cylinder 76 to the de-mountable nipple 73, a lateral threaded opening 79 (see Fig. 4) communicating with the opening 69 or 70 may be provided in the barrel portion 11 and in each of said openings 79 there may be provided a valve 80. The valve 80 extends into the passageways 69 or 70 and may be actuated by knob 81 to vary the opening 82 between passages 69 or 70 and valve 80 to control the flow of material through the supply openings and into the chamber 68. These adjustable valves 80 may be associated with both of the openings 69 or 70 and independently or dependently (as by direct linkage with trigger 38) are operable to vary the flow in either or both of said openings 69 or 70.

Receiving chamber 68 is in axial alignment with valve operating chamber 45 and partially hollow valve rod 50 projects into said chamber and is slideably movable toward and away from the front end of the chamber 68, is slideably borne and guided in a packing nut 85 screwed into the rear of said chamber 68. The rearwardly extending portion 86 or nut 85 is externally threaded and a hollow clamping nut 87 is screwed thereon and serves to force and clamp packing material 88 tightly about the valve rod 50 and seal the rear end of said receiving chamber 68 against leakage while permitting sliding movement of said rod. The front end of chamber 68 is internally screw threaded and terminates in a flat frontpiece 89 of the barrel 11, and a fluid tip 90 is adapted to be received in said screw threaded chamber 68.

This fluid tip 90 is provided with a screw threaded extension 91, whereby it is secured in position engaging the forward screw head of the receiving chamber 68. It has a hexagonally or polygonally shaped flange directly adjacent the extension 91 and a conical portion having a circular recess or slot 93 to provide a pair of frusto-conical portions 94 and 95, with the greatest diameter of portion 94 being equal to the perpendicular distance between the faces of flange 92. The forward end of tip 90 is a short conical section 96 terminating in a small diameter cylindrical nose. The forward end of conical opening 98 acts as a valve seat for the forward end of valve rod 50. The nose has a small diameter exit, provided with support means for centering the valve rod 50, as for example, a cloverleaf opening 97, therein communicating with a conical opening 98 in cone 96 which in turn communicates with a cylindrical opening 99 whose diameter is equal to that of the base of cone opening 98. The small cloverleaf opening 97 provides a bearing for the hollow needle or valve rod 50. This bearing surface is of importance since it keeps the hollow valve rod 50 in a central position at all times with respect to the orifice conical opening 98.

The flange 92 has a shallow annular recess 100 therein at about the mid-thickness thereof. Equal spaced small cylindrical openings 101 parallel to the opening 99 extend through the portion 94 to provide communicating passageways between the recess 100 and the annular recess 93. The portion 95 has a plurality of slots 102 throughout the entire length thereof. These slots 102 are of uniform depth and length. The lower ends of the slots 102 terminate near the ends of the openings 101.

The plunger or front portion of the hollow valve rod 50 is in the form roughly of an elongated needle or rod having a rear portion 105 extending from the shoulder 53 through opening 51, packing nut 87 and bushing 85 and into chamber 68, and a hollow front portion 106 of smaller diameter than rear portion 105 and constricting to a conical or valve tip 107. Hollow valve rod 50 has a passageway 135 beginning at a point directly above passageway 70 when fully retracted and extending throughout rod 50 to the rod tip 136. The portion 105 of hollow valve rod 50 has an annular groove 137 located at the inner end of passageway 135 within valve rod 50 and communicating therewith, as by bored passageway 138. Opening 139 within packing nut 85 lines up with annular groove 138 when the trigger is depressed. Opening 139 within packing nut 85 opens into passageway 70. Therefore, when the trigger is depressed and the gun is in operation, opening 139 communicates with annular groove 137, passageway 138, and passageway 138 opens into axially bored passageway 135 within valve rod 50 thereby providing a continuous passage for fluids through passageway 70, 139, 138, 137 and 135 and out to the tip 136 of the gun. Packing nut 85 projects into longitudinal chamber 68 to a point approximately halfway between passageways 69 and 70. The valve packing 140 is located on the inner end of packing nut 85. Inside packing nut 141 is adapted to screw thread into the threaded portion of chamber 68 and press the packing 140 against inside end portion of packing nut 85 thereby effecting a positive seal against the flow of fluid between passageways 69 or 70. In this manner, the fluids entering chambers or passageways 69 or 70 do not come into contact with one another until they leave their respective orifices at end of gun.

Other means of slideably mounting hollow valve rod 50 within the chamber 68 while maintaining the fluids supplied from passageways 69 and 70 separate, may be employed in lieu of those shown.

The air passages 19 and 32 extend substantially horizontally along the barrel toward its forward end to the respective chambers 108 and 109 (Fig. 2) and converge slightly in their approach thereto. The passageway 110 extends upwardly and outwardly in the barrel 11 from the chamber 108 and terminates in a flat front face 112 of said barrel directly adjacent and outside of the flange 92.

A passageway 113 leads upwardly and outwardly in the barrel 11 from the chamber 109 and also terminates in the front flat face 112 of said barrel at a diametrically opposite point, to terminus of said passageway 108. The passageway 113 communicates with the recess 100. The chambers 108 and 109 are provided to facilitate the boring of the respective passageways 110 and 113 and each is suitably sealed at its lower end by the respective sealing plug 115. In this manner, two continuous air passages from the air distributing chamber 16 to the tip or forward end of the barrel are provided, one of which is independently valve controlled through the valve 33 whereby air through passageways 32, 109 and 113 may be adjustably restricted or cut off entirely as desired.

An air cap 120 may be applied over the fluid tip 90 and is preferably of the external or outside mixed type. The air cap 120 is of generally cylindrical external contour and has a lower portion of enlarged diameter to provide a retaining shoulder 121. The nozzle 120 has a front closure 122 and is hollow to provide a generally conical internal face 123. The closure 122 has a central circular opening 124 therethrough and the diameter of this opening is somewhat larger than the external diameter of the nose of fluid tip 90. The nozzle 120 also includes a pair of air jet outlet members 125 intergal with closure 123 and longitudinally extending therefrom. These members 125 are diametrically arranged at opposite ends or sides of the opening 124.

The upper part of the facing sides 126 of members 125 slant upwardly outwardly away from each other. Each of said members is provided with a passage outlet 128 disposed at about right angles to the face 126 and communicating with an opening 129 which extends from opening 128 and extends through the lower or inner face of air cap 120. The air cap 120 is mounted on the fluid tip 90 as shown in Figs. 1 and 2, with the inner edge of the lower part of nozzle 120 abutting against the inner edge of flange 92. The lower face of nozzle 120 extends outwardly beyond flange 92 leaving exposed the lower end of passageways 129. The entire outermost conical faces of portions 94 and 95 of fluid tip 90 snugly abut against the lower internal conical face 123. The nose of the fluid tip 90 extends through the opening 124 and its outer extremity is located beyond the front face of closure 122. Between the inner face of closure 122 and the upper end of conical portion 94 is an air chamber 132. A threaded collar or clamping nut 133 is threadedly connected to the front end of barrel 11 and has a flange 134 abutting against shoulder 121 to demountably lock the fluid tip 90 in position. The desired angular position of the members 125 may be varied by merely loosening the nut 133 and rotating the air cap the proper amount.

Air under pressure passes out of passageway 113, into annular recess 100 and then through the equally spaced openings 101. From the openings 101, the air travels through into annular recess 93, through the slots 102, into chamber 132, through the portion of the passage 124 around the circumference of the projecting nose of fluid tip 90.

The gas as it passes beyond the front face of the closure 122 sets up an eddy current effect at the discharge terminus of said nose of tip 90. These eddy current effects serve to atomize the fluid as it passes out of said nose and towards the surface to be coated. Air under pressure from the passageway 110 enters the chamber 142, whose one side is formed by the lock nut 133, then passes through the passageways 129, then through 128 and project toward each other to at least partially disperse and break up the effluent from the end 136 of hollow valve rod 50, admix it with the effluent from fluid tip 90, and control the shape and dimensions of the spray.

The novel spray gun may be coupled with different sources of reactive fluids through flexible hose lines 158 and 165 connected to the nipples 73 for delivering the fluids to the chamber 68. The spray gun may be coupled with a flexible hose 198 carrying gas or fluid under pressure and connected thereto at the lower end of the handle 12 to supply gas or fluid under pressure to the passageway 14. It is to be noted at this point that the front portion 106 of the hollow needle 50 should project beyond the central opening 124 in air cap 120 when the trigger 38 is in a fully retracted position, or "fully triggered." Satisfactory results have been secured when the amount of projection of tip 136 of hollow needle 50, in fully triggered position, is at least about one-fourth of the distance between the central opening 124 and a line joining the centers of passage outlets 128.

Best results have been secured when the amount of projection of tip 136 of hollow needle 50, in fully triggered position, is about three-fourths of the distance between the central opening 124 and a line joining the centers of passage outlets 128.

When the valve portion 107 seats in the opening 98, and it is normally in this position when the trigger is not actuated by any outside force, the fluid receiving chamber 68 is sealed to prevent the passage of fluid out of the orifice 97. When said valve 107 is opened by pressure on the trigger as before described, fluid passes from the chamber 69 into chamber 68 and out through the forward end of the orifice 97 in the nose.

Simultaneously, the grooved portion 137 of hollow needle 50 is withdrawn by the trigger action to a position in communication with the outlet of passageway 139 thereby permitting the flow of fluid through passageway 70, passageway 139, groove 137, bore passageway 138, passageway 135 axially of rod 50 and out through the tip 136.

In operation, after the flow from the sources of reactive fluid supplied has been properly adjusted and the pressure in the gas supply line to the spraying device has been properly adjusted, e. g., a pressure of from 25–75 p. s. i., and the spraying device has been connected to said gas supply line and to the fluid supply lines from said sources of reactive fluid supply, the operator is ready to spray coat. In the practice of this invention, materials of different viscosities may be employed in the lines 158 and 165 and if of different viscosity, it is preferred that the higher viscosity material be in line 165 connected to the passageway 69. Chemically curing resin, for example, is conveyed through hose 165, through the passageway 69 and into the front portion of chamber 68. A curing agent for the particular resin is conveyed through hose 158, through passageway 70 and into the passageway 135 of hollow valve rod 50. The gas under pressure is conveyed through hose 198 through the passageway 13 into chamber 15. With the valve 33 set in open position shown in Fig. 2, the spraying device is ready for operation. It is to be understood that if desired, the valve 80 may be completely eliminated and is employed only if adjustable means for regulating the flow of fluids in passageways 69 and 70 are desired.

In a preferred embodiment of this invention, the chamber 68 has an internal diameter of about .375 inch. When it is desired to throttle the flow of fluids through hoses 165 and 158, the bored plugs 76 having therethrough passageways 77 may be inserted in internally threaded nipple 73. Thus, for example, where two different colored paints of spraying viscosity were to be employed, more satisfactory results would be obtained by utilizing the bored plugs 76. Where a viscous film-forming resin is to be sprayed, the bored plugs 76 may be omitted from the device. Where bored plugs 76, in either one or both of lines 165 and 158 are used, the opening 77 may be varied between about .025 inch and .10 inch and the length of the bored plug 76 is desirably about at least .5 inch.

The operator forces the trigger 38 towards the handle 12. The trigger 38 first strikes the rod 24 to unseat valve 23 whereupon the air passes into chamber 16, through passages 18, 19, 108, 110 into chamber 142 and through passages 129 and 128; and also from chamber 16 through passages 20, chambers 21, passages 32, 109, 113, slot 100, openings 101, slots 93, 102, chamber 132 and then between the outside of the nose of fluid tip 90 and the orifice 124 and annularly with respect to the protruding tip 136 of hollow rod 50.

While the air continues following the aforementioned path the trigger strikes the nose 58 and retracts the hollow valve rod 50 to open the fluid discharge orifice 97 at the end of the material receiving chamber formed by the chamber 68 and the chamber in said fluid tip 90. When the trigger is in a completely retracted position, valve rod 50 is then so aligned that the passageway 70 and passageway 135 are connected together and the material flows from passageway 70 into passageway 135. The material from passageway 69 discharges out of said orifice 97 simultaneously with the material discharging from the hollow needle valve 50 and are both atomized by the eddy currents created by the discharge of air through the orifice 124 outside the gun and as the atomized materials in their course of travel towards the surface to be coated pass between the air jets from openings 128, they are thoroughly mixed and the configuration of the spray is modified. When the trigger 38 is released, the orifice 97 is first closed by the valve rod 50 and then the valve 15 assumes its closed position.

Likewise, when trigger 38 is released, annular groove 137 moves out of communication with passageway 139, and flow of fluid through passageway 70 is effectively stopped.

The foregoing system and spray device may be employed by even an unskilled workman and may be employed to carry out our novel method for obtaining spray coatings of chemically curing resins and curing agents therefor. Although the invention has been described in detail, it is not to be limited thereby because many changes and modifications may be made without departing therefrom.

Reference may be had to patents of Downs and Einbecker, namely, Downs, 2,504,116 and 2,504,117; and Einbecker, 2,511,626, 2,511,627 and 2,513,081, for a fuller understanding of the mechanisms to which the improvements may be related.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. In a multi-component spraying device having trigger means for operating said device, a body, an elongated fluid receiving chamber divided into a plurality of non-communicating inner units, fluid supply inlets communicating with said non-communicating inner units, a hollow rod retractably moveable with said trigger means and adapted to receive and discharge fluid from one of said inner units, and an exit from another of said inner units annular with respect to said hollow rod, said hollow rod projecting beyond said exit when the gun is fully triggered, said body having a passageway for transmitting gas under pressure close to and externally of said exit and hollow rod end to convert into a spray the fluid discharge therefrom.

2. In a plural fluid spraying device having trigger means for operating said device, the improvement which comprises a body having an elongated fluid receiving chamber divided into a plurality of non-communicating inner units, fluid supply inlets communicating with said non-communicating inner units, a hollow rod retractably moveable with said trigger means and adapted to receive and discharge fluid from one of said fluid supply inlets, a discharge orifice formed to maintain said hollow rod in a substantially axial position with respect to said orifice while permitting the flow of fluid from another of said fluid supply inlets when said hollow rod is in a triggered position, said hollow rod when in a fully triggered position projecting beyond said orifice, said body having a passageway for transmitting gas under pressure close to and externally of said orifice to convert into a spray the fluid discharge therefrom.

3. In a plural fluid spraying device having trigger means for operating said device, the improvement which comprises a body having a plurality of non-communicating fluid receiving chambers having separate fluid supply inlets, a hollow rod retractably moveable with said trigger means and adapted to receive and discharge fluid from one of said fluid supply inlets, a discharge orifice adapted to discharge fluid from another of said fluid supply inlets, said discharge orifice being annular with respect to said hollow rod and containing means for centering said hollow rod within said orifice while permitting flow of fluid therefrom, said hollow rod when in operating position projecting beyond said discharge orifice, said body having a passageway for transmitting gas under pressure close to and externally of said orifice to convert into a spray the fluid discharge therefrom.

4. In a multi-component spraying device having trigger means for operating said device, an elongated fluid receiving chamber divided into a plurality of non-communicating inner units, fluid supply inlets communicating with said non-communicating inner units, a hollow rod retractably moveable with said trigger means and adapted to receive and discharge fluid from one of said inner units, an exit from another of said inner units annular with respect to said hollow rod and containing means for centering said rod within said exit, air jets located at a point beyond said exit adapted to mix and modify the spray from the exit and hollow rod, said hollow rod when in a triggered position projecting beyond said exit to a point approximately in line with said air jets.

5. In a plural fluid spraying device having trigger means for operating said device, the improvement which comprises a body having a plurality of non-communicating chambers having separate fluid supply inlets, a hollow rod slideably mounted within said plurality of chambers and retractably moveable with said trigger means, said hollow rod being adapted to receive and discharge fluid from one of said fluid supply inlets, an exit from another of said supply inlets containing means for centering the discharge end of said hollow rod within said exit while permitting the flow of fluid therefrom, said hollow rod projecting beyond the exit when in a triggered position, said body having a passageway for transmitting gas under pressure close to and externally of said exit and hollow rod end to convert into a spray the fluid discharge therefrom.

6. In a plural fluid spraying device having trigger means for operating said device, capable of producing coatings from chemically hardening resins in a single spraying operation, comprising a body, an elongated fluid receiving chamber having a restricted discharge orifice at one end thereof, a plurality of separate fluid supply inlets communicating with said chamber, the central longitudinal axis of each of said inlets being at an angle to the central longitudinal axis of said chamber, the distance between said orifice and the point at which said axis of one of said inlets enters said chamber being greater than the distance between said orifice and the point at which said axis of another of said inlets enters said chamber, said body having a passageway for transmitting gas under pressure close to and externally of said orifice to convert into a spray the fluid discharge therefrom, the improvement which comprises means for dividing said elongated fluid receiving chamber into a plurality of non-communicating units individually supplied by said separate fluid supply inlets, said discharge orifice discharging fluid from only one of said non-communicating units, and a hollow rod retractably moveable with said trigger means and adapted to receive and discharge fluid from another of said non-communicating units at a point beyond said discharge orifice and outside said device.

7. In a plural fluid spraying device, capable of producing coatings from chemically hardening resins in a single spraying operation, comprising a body, an elongated fluid receiving chamber having a restricted discharge orifice at one end thereof, a plurality of separate fluid supply inlets communicating with said chamber, the central longitudinal axis of each of said inlets being at an angle to the central longitudinal axis of said chamber, the distance between said orifice and the point at which said axis of one of said inlets enters said chamber being greater than the distance between said orifice and the point at which said axis of another of said inlets enters said chamber, said body having a passageway for transmitting gas under pressure close to and externally of said orifice to convert into a spray the fluid discharge therefrom, the improvement which comprises means for dividing said elongated fluid receiving chamber into two non-communicating units individually supplied by said separate fluid supply inlets, said discharge orifice discharging fluid from the unit closest to said orifice annularly with respect to a hollow valve rod adapted to receive fluid from the unit most remote from said orifice and to discharge at a point beyond said discharge orifice and outside said device, said hollow valve rod being formed at a forward portion as a valve and said discharge orifice formed at its inner surface as a valve seat to control the flow of fluid from the foremost unit.

8. In a plural fluid spraying device, capable of producing coatings from chemically hardening resins in a single spraying operation, comprising a body, an elongated fluid receiving chamber having a restricted discharge orifice at one end thereof, a plurality of separate fluid supply inlets communicating with said chamber, the central longitudinal axis of each of said inlets being at an angle to the central longitudinal axis of said chamber, the distance between said orifice and the point at which said axis of one of said inlets enters said chamber being greater than the distance between said orifice and the point at which said axis of another of said inlets enters said chamber, said body having a passageway for transmitting gas under pressure close to and externally of said orifice to convert into a spray the fluid discharge therefrom, the improvement which comprises means for dividing said elongated fluid receiving chamber into two non-communicating units individually supplied by said separate fluid supply inlets, said discharge orifice discharging fluid from the unit closest to said orifice annularly with respect to a hollow valve rod adapted to receive fluid from the unit most remote from said orifice and to discharge at a point beyond said discharge orifice and outside said device, said hollow valve rod being formed at a forward portion as a valve and discharge orifice being formed at its inner surface as a valve seat to control the flow of fluid from the foremost unit, said hollow valve rod also being formed at a point within the unit most remote from said orifice as a valve to control the flow of fluid from the most remote unit.

References Cited in the file of this patent
UNITED STATES PATENTS

| Number | Name | Date |
| --- | --- | --- |
| 1,936,997 | String | Nov. 28, 1933 |
| 1,939,607 | Krantzberger | Dec. 12, 1933 |
| 1,958,730 | Tracy | May 15, 1934 |
| 2,335,116 | Hansen | Nov. 23, 1943 |
| 2,504,116 | Downs | Apr. 18, 1950 |

FOREIGN PATENTS

| Number | Country | Date |
| --- | --- | --- |
| 383,768 | Great Britain | Nov. 24, 1932 |